(12) United States Patent
Schaffner et al.

(10) Patent No.: US 7,941,022 B1
(45) Date of Patent: May 10, 2011

(54) SINGLE FIBER OPTICAL LINKS FOR SIMULTANEOUS DATA AND POWER TRANSMISSION

(75) Inventors: James H. Schaffner, Chatsworth, CA (US); Dennis C. Jones, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 237 days.

(21) Appl. No.: 12/116,180

(22) Filed: May 6, 2008

(51) Int. Cl.
*G02B 6/036* (2006.01)

(52) U.S. Cl. ......... 385/127; 385/123; 398/141; 398/171

(58) Field of Classification Search .................. None
See application file for complete search history.

(56) References Cited

U.S. PATENT DOCUMENTS

| | | | | |
|---|---|---|---|---|
| 4,928,319 | A * | 5/1990 | Pitt et al. | 398/171 |
| 5,119,679 | A * | 6/1992 | Frisch | 73/705 |
| 5,664,035 | A * | 9/1997 | Tsuji et al. | 385/24 |
| 5,714,773 | A * | 2/1998 | Burrows et al. | 257/82 |
| 6,295,161 | B1 * | 9/2001 | Bazzocchi | 359/341.33 |
| 6,329,906 | B1 | 12/2001 | Fisher et al. | |
| 7,072,588 | B2 * | 7/2006 | Skinner | 398/171 |
| 7,388,892 | B2 * | 6/2008 | Nishiyama et al. | 372/38.02 |
| 2005/0226625 | A1 * | 10/2005 | Wake et al. | 398/115 |
| 2008/0277565 | A1 * | 11/2008 | Bookbinder et al. | 250/206 |
| 2009/0016715 | A1 * | 1/2009 | Furey | 398/38 |

OTHER PUBLICATIONS

Y. Liu et al. Optically powered optical interconnection system. IEEE Photonics Technology Letters, 1:1:21-23, Jan. 1989.*

C. Klamouris et al. Optically powered platform with Mb/s transmission over a single fiber. European Conference on Optical Communications (ECOC 2006), Sep. 2006.*

T. Banwell et al. Powering the fiber loop optically—a cost analysis. Journal of Lightwave Technology, 11:3:481-494, Mar. 1993.*

H. Kirkham and A.R. Johnston, "Optically Powered Data Link for Power System Applications", IEEE Trans. on Power Deliver, vol. 4, No. 4, Oct. 1989, pp. 1997-2004.

R. Pena, C. Algora, I.R. Matias and M. Lopez-Amo, "Fiber-based 205-mW (27% efficiency) power-delivery system for an all-fiber network with optoelectronic sensor units", Applied Optics, vol. 38, No. 12, Apr. 20, 1999, pp. 2463-2466.

J. Nilsson, et al., "High Power Fiber Lasers", Technical Digest of the Optical Fiber Communication Conference 2005. OFC/NFOEC, vol. 2, Mar. 6-11, 2005, OTuF1, 4 pages.

M.J. Landry, J.W. Rupert and A. Mittas, "Power-by-light systems and their components: an evaluation", Applied Optics, vol. 30, No. 9, Mar. 20, 1991, pp. 1052-1061.

(Continued)

*Primary Examiner* — Mike Stahl
(74) *Attorney, Agent, or Firm* — Christopher R. Balzan

(57) ABSTRACT

In one embodiment, a fiber optic link includes a combined optical link for transmitting high optical power and wide bandwidth signal through a single optical fiber. In one embodiment, a means is provided for combining a high power optical signal and a low power data signal with wavelength selective directional couplers so as to inhibit the low power data transmitter and the low power data receiver from being overloaded with too much power. In one implementation, a method of using double clad fiber is provided, which includes transmitting an optical data signal at an optical data wavelength along an inner core, the inner core being single mode at the optical data wavelength and simultaneously transmitting an optical power signal at a optical power wavelength through a cladding, the cladding serving as a multimode core for a power optical link at the optical power wavelength.

22 Claims, 2 Drawing Sheets

OTHER PUBLICATIONS

P. Even and D. Pureur, "High Power Double Clad Fiber Lasers: A Review", Optical Devices for Fiber Communicatiions III, Proceedings of SPIE, vol. 4638, 2002. pp. 1-12.

H. Miyakawa, et al., "Photovoltaic cell characteristics for high-intensity laser light fiber optic power transmission systems", Coference Record of the Twenty-Ninth IEEE Photovoltaic Specialist Conference, May 19-24, 2002, pp. 1653-1655.

C.E. Backus, "Laser Activation of Solar Cells", Proceedings of the 9th IEEE Photovoltaic Specialists Conference, Silver Spring, MD, May 1972, pp. 61-65.

John Gower, Optical Communication Systems, 2nd Edition, Prentice-Hall, New York, 1984, pp. 34-40 and 82-85.

Crystal Fibre A/S, Double Clad High NA Fiber—DC-165-16 Passive fiber manufactured by Crystal Fibre A/S, Denmark, www.crystal-fibre.com, DC-185-16-Passive Rev. 1.0, Nov. 2004, 1 page.

Highwave Optical Technologies, Combo Multimode Power & Signal combiner, by Highwave Optical Technologies, France, www.highwave-tech.com; Spec. Ref.:HWT-FIB-Combo, Rev.1—04-04, 1 page.

IPG Photonics, DRL Series, Fiber Pigtailed Direct Diode Industrial Grade Laser System, IPG Photonics, Oxford, MA, www.ipgphotonics.com, P23-000192 05/05, 2 pages.

* cited by examiner

SINGLE FIBER OPTICAL LINKS FOR SIMULTANEOUS DATA AND POWER TRANSMISSION

ORIGIN OF THE INVENTION

This invention was made with government support under Contract No. HR0011-05-C-0060 awarded by DARPA. The government has certain rights in this invention.

BACKGROUND

Unattended sensors, micro- or miniature-air vehicles (MAVs) and Unmanned Ground Vehicles (UGVs) will require more energy than batteries can supply. The delivery of high power through an optical fiber to a remote platform or location is a powerful enabler of systems with new and expanded capabilities relative to systems currently fielded. Among the possible systems that may be considered are MAVs, UGVs, other unattended sensors and vehicles, and remotely located actuators within larger platforms such as aircraft. Most of these systems currently exist with traditional means of power delivery such as batteries, photovoltaics, miniature internal combustion engines, copper electrical cables, or hydraulic systems. Use of these traditional means imposes a variety of limitations on the system operation. These limitations include system weight and size, observability, operating time, maximum power available, high voltage insulation and safety issues, and system reliability and redundancy.

What is needed is a method and system that overcomes some or all of these limitations.

SUMMARY

In various embodiments, a fiber optic link is provided that includes a combined optical link for transmitting high optical power and wide bandwidth signal through the single optical fiber.

In one embodiment, provided is a means for combining a high power optical signal and a low power data signal with wavelength selective directional couplers so as to inhibit the low power data transmitter and the low power data receiver from being overloaded with too much power.

In one implementation, a method of using double clad fiber is provided, which includes transmitting an optical data signal at an optical data wavelength along an inner core, the inner core being single mode at the optical data wavelength and simultaneously transmitting an optical power signal at a optical power wavelength through a cladding, the cladding serving as a multimode core for a power optical link at the optical power wavelength.

In one embodiment, a fiber optic system is provided which has a high power link and an optical data link. The high power link includes a single fiber dual optical link, a laser power source coupled via a first wavelength selective coupler to the single fiber dual optical link, and a laser energy power converter coupled via a second wavelength selective coupler to the single fiber dual optical link. The optical data link includes the single fiber dual optical link, a data transmitter coupled via the first wavelength selective coupler to the single fiber dual optical link, and a data receiver coupled via the second wavelength selective coupler to the single fiber dual optical link.

BRIEF DESCRIPTION OF THE DRAWINGS

The features and advantages of the present invention will be better understood with regard to the following description, appended claims, and accompanying drawings where:

DESCRIPTION

The optical transmission of power would be useful for applications such as unattended sensors or unmanned vehicles need to operate much longer than is possible with batteries, and where power transmission by metallic wire is unacceptable because of weight or electromagnetic compatibility issues. In various implementations of the present invention, a clad optical fiber is used to transmit both power and data.

The prior art utilizes double clad fibers for amplifiers and lasers by injecting a short wavelength optical signal (980 nm) into the cladding, which interacts with and stimulates an active dopant in the fiber core to provide coherent energy, and hence gain, to a longer wavelength optical input signal (1300 or 1550 nm) in the core. In such applications the wavelength $\lambda_1$ in the core is greater than the wavelength $\lambda_2$ in the cladding Thus, for fiber optical amplifiers and lasers $\lambda_1 > \lambda_2$.

Figure 1:
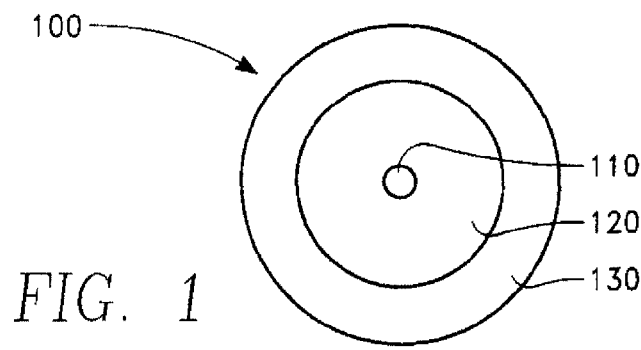
FIG. 1 shows a cross sectional view of an embodiment of a double clad fiber.

In a present implementation, a double clad fiber 100 shown in FIG. 1 is used is used in a totally different manner. The double clad fiber 100 is used as a dual link fiber, with simultaneous high power and data links. FIG. 1 shows a cross sectional view of an embodiment of a double clad fiber 100. The core 110 of the double clad fiber 100 supports a single mode at a short wavelength, for example at 850 nanometers free space wavelength, for the data link. The first cladding 120 is used for propagation of a multimode longer wavelength optical power signal, for example at 1060 nanometers free space wavelength. The first cladding 120 serves as a multimode core for the high power optical link. Since interaction/amplification between the beams within the double clad fiber 100 is not desired between the power and data links, the index profile of the double clad fiber 100 may be achieved without dopants that are active at the wavelengths of interest.

As illustrated in FIG. 1, the core 110 is a single mode fiber with a first index of refraction $n_1$ at a first wavelength $\lambda_1$. A first cladding 120 is a multi-mode layer with a second index of refraction $n_2$ at a second wavelength $\lambda_2$. An optional second cladding 130 has an index of refraction $n_3$. For simultaneous data and power transmission, the second wavelength $\lambda_2$ is greater than $\lambda_1$. Additionally, the index of refraction $n_1$ is greater than the index of refraction $n_2$, which is greater than the index of refraction $n_3$. Thus, $\lambda_2 > \lambda_1$ and $n_1 > n_2 > n_3$.

An example of a double clad fiber 100 that could be adapted for use in some embodiments is produced by Crystal Fiber A/S, Birkerød, Denmark, which has microstructuring of the inner cladding 120. Other index profiles of fibers could be designed and fabricated by companies that grow specialty fibers. The single mode core 110 has much less dispersion than the multi mode cores of the typical double clad fiber used in amplification applications. As a result of the lower dispersion, bit rates in the 10's of Gbps-km are achievable in the core.

Figure 2:
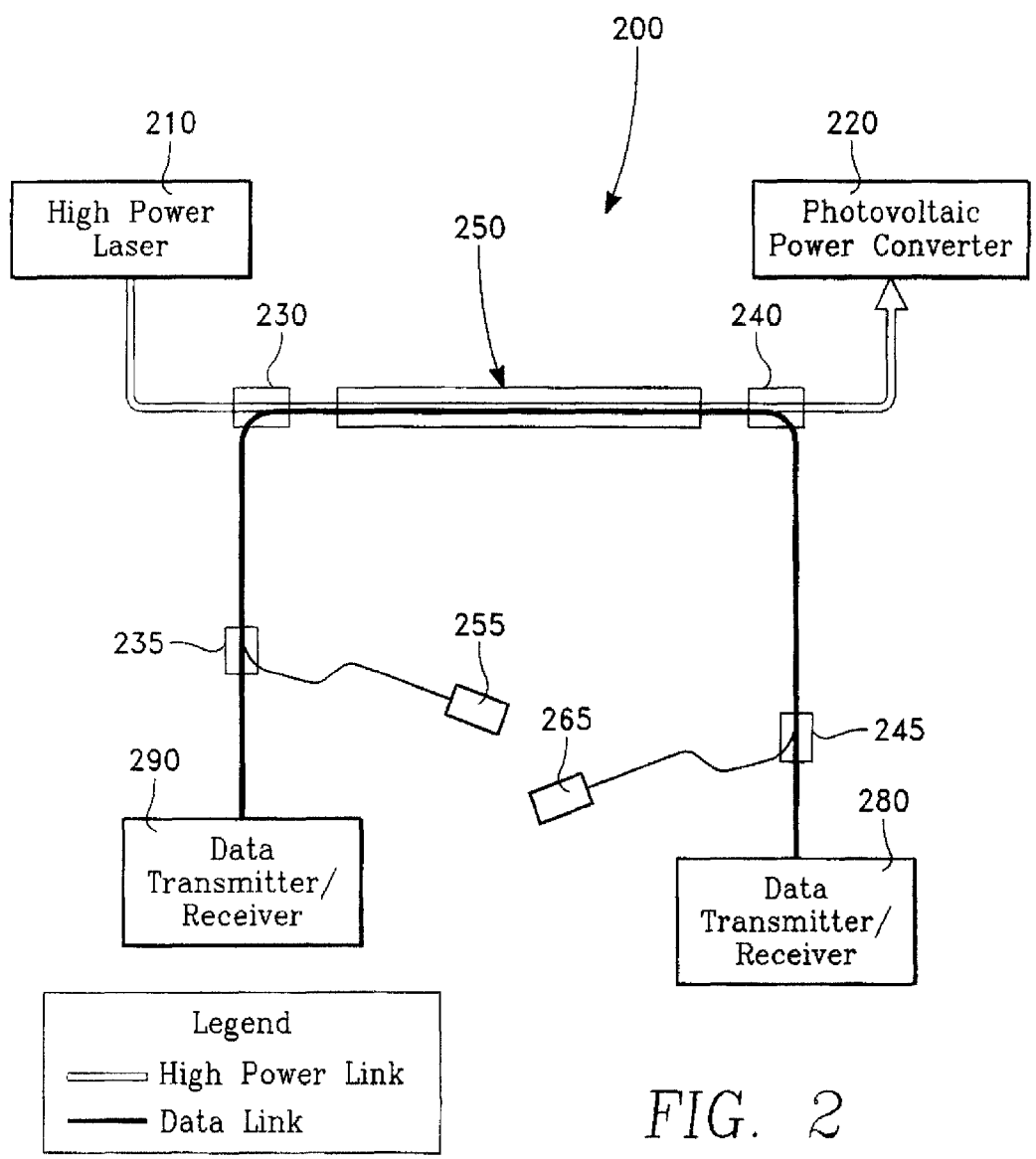
FIG. 2 is a simplified block diagram of one possible implementation of a single fiber dual optical link system for simultaneous data and power transmission.

FIG. 2 is a simplified block diagram of one possible implementation of a single fiber dual optical link system 200 for simultaneous data and power transmission. A dual link fiber 250 is coupled between a high power laser 210 and a photovoltaic power converter 220. The dual link fiber 250 is also coupled between a power source side transmitter/receiver 290 and a photovoltaic power converter side transmitter/receiver 280. The high power laser 210 and the power source side transmitter/receiver 290 are coupled to the dual link fiber 250 via a wavelength selective coupler 230. Similarly, the photovoltaic power converter 220 and the photovoltaic side transmitter/receiver 280 are coupled to the dual link fiber 250 via a wavelength selective coupler 240.

Optional secondary wavelength selective couplers 235 and 245 may be coupled between the data transmitter/receivers 290 and 280, respectively, to further protect against any over load of the data transmitter/receivers 235 and 245 by high power signals. Optical terminations 255 and 265 may be attached to the secondary wavelength selective couplers 235 and 245, respectively, to terminate any high power signals from the secondary wavelength selective couplers 235 and 245. Thus, the power side data transmitter/receiver 290 is coupled to the dual link fiber 250 through both the wavelength selective coupler 235 and the wavelength selective coupler 230. Similarly, the photovoltaic cell side transmitter/receiver 280 is coupled to the dual link fiber 250 through both the wavelength selective coupler 245 and the wavelength selective coupler 240.

The wavelength selective couplers 230 and 240 integrate the optical power link and the data link into the dual link fiber 250. In some embodiments, commercially available wavelength division multiplexer splitters may be used. Known methods may be used for fabricating wavelength selection couplers and for injecting high power optical signals into the inner cladding of a double clad fiber 100.

The secondary wavelength selective couplers 245 and/or 235 may be used because most couplers have residual directivity that allows a fraction of the high optical power to leak into the fiber paths toward the data link transmitter/receivers 280 and/or 290. Typical directivity of optical couplers ranges from 30-50 dB. Even with 50 dB directivity, a 1 kW laser, as much as 10 mW of the power signal could otherwise reach the data link photodetector. This value is typically more than the optical power generated by a high quality laser for wideband fiber optic data links. Thus, the photodetector in a data receiver would be swamped by the leakage from the high power link.

Fortunately, since the optical power signal and the data link signal are at two separate wavelengths, the secondary set of wavelength selective couplers 235 and 245 can be used to inhibit the data link from being overloaded by the high power optical signal. The residual high power optical wavelength can then be safely disposed of in the optical terminations 255 and/or 265, coupled to secondary wavelength selective coupler 235 and/or 245, respectively. Or, in some embodiments, optical filters may be used in place of the secondary wavelength couplers 235 and 245 and the optical terminations 255 and 265, if desired.

The high power laser 210, such as a fiber coupled laser capable of producing on the order of 100 Watts, is commercially available, for example by IPG Photonics, Oxford, Mass. www.ipgphotonics.com. Higher or lower optical power fiber coupled lasers may be used. While the majority of applications for high power systems are industrial processes such as precision soldering, brazing, and welding, such known high power systems may be used, or adapted for use, in the single fiber dual optical link system 200.

In various embodiments, the lasers could be either direct diodes or solid-state lasers pumped by diodes, with either narrow or broad linewidths. In one direct diode example embodiment, high power diode sources are combinations of linear arrays and two dimensional stacks. These lasers are incoherent with each other, and the resulting beam can generally only be focused into large core fibers, 400 micrometers and above. The exception to this occurs if the fiber is made to accept a large focusing angle. The fibers with the highest numerical aperture are the so-called air-guided fibers, whose cladding is mostly air, with just thin bridges of glass to support the structure. Possibly a factor of 3 reduction in core diameter can be realized.

In another example embodiment, a narrow-bandwidth solid-state laser may be used, such as for example a Nd:YAG, or Yb:YAG, or a fiber laser with a narrowband grating reflector. Power transmission in a solid core fiber would be limited by stimulated Brillouin scattering (SBS), the interaction of the light with acoustic waves in the glass, which can scatter laser power back to its source. SBS reduction by as much as 1000× is predicted in another type of air-guided fiber structure known as the hollow-core photonic crystal fiber (PCF). Extrapolating from the well-known SBS thresholds in single-mode fibers, a PCF with a 50 micrometer hollow core will be adequate.

In yet another example embodiment, a broad-linewidth solid-state laser may be used. An example of this might be a fiber laser with a gain-flattening grating. The line broadening would eliminate SBS as the limiting nonlinearity. Conventional 125 micrometer-cladded diameter fiber is possible. With such a fiber, however, there is another nonlinearity, Raman scattering, which will shift the wavelength of the guided light farther into the infrared as it propagates along the fiber. This creates some loss, but is not a major problem for some embodiments, unless it shifts the wavelength beyond the bandgap of the photovoltaic material. For example, a Yb fiber laser may experience enough Raman gain to shift from 1.03 micrometers to 1.08 micrometers for core diameters less than 250 micrometers, a shift that could decrease the detection efficiency in silicon 50%. In such a case, a thicker photovoltaic could partially make up for this loss in absorption.

Figure 3:
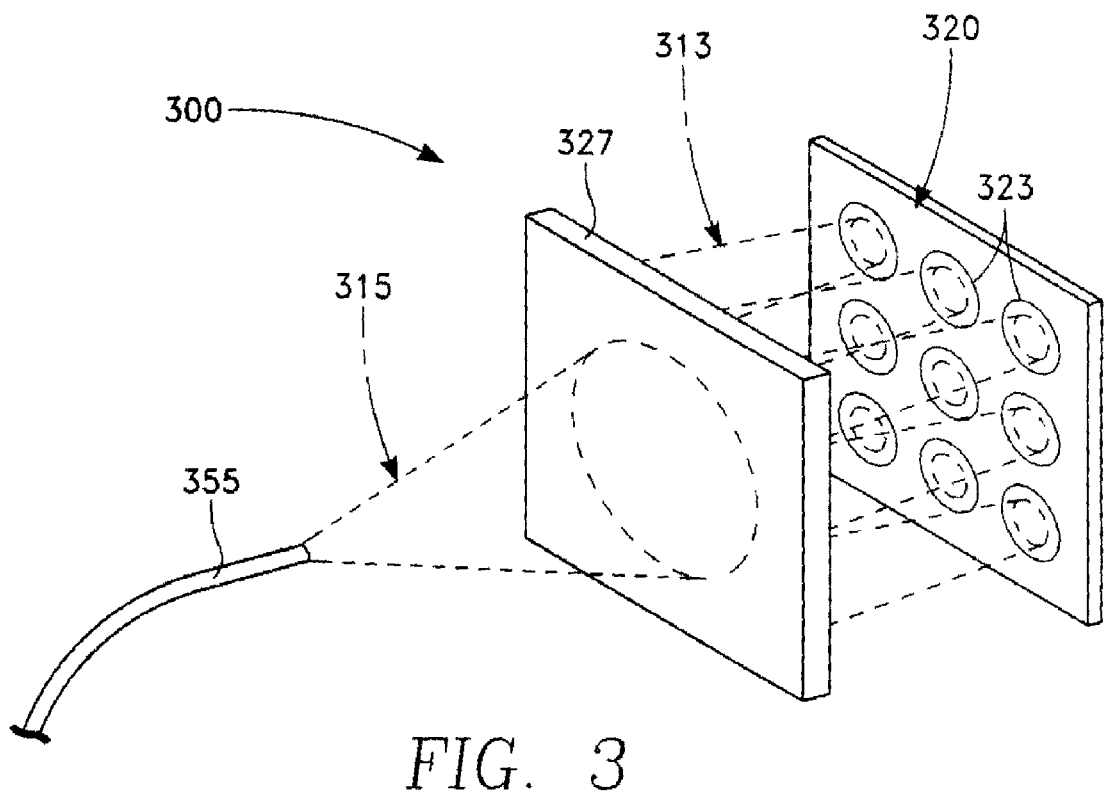
FIG. 3 is a perspective view of a possible embodiment of a photovoltaic power converter which may be used in the single fiber dual optical link system of FIG. 2.
Figure 4:
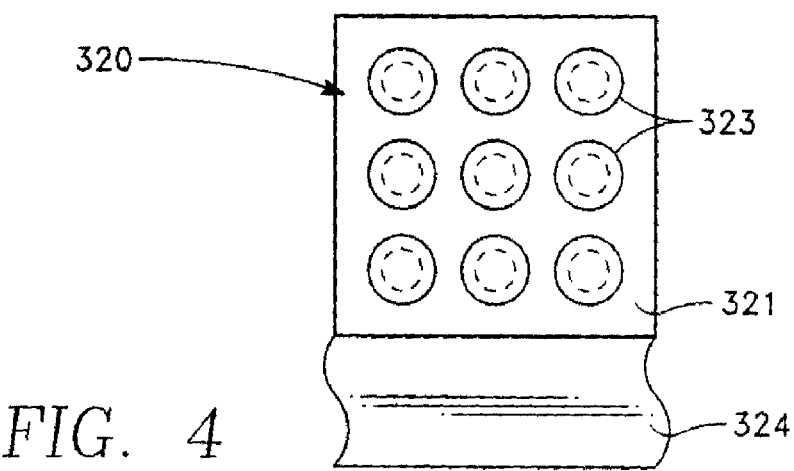
FIG. 4 is a front view of an example of an array of photovoltaic cells of FIG. 3.

Turning to FIGS. 3 and 4, shown in FIG. 3 is a perspective view of a possible embodiment of a photovoltaic power converter 300 which may be used as the photovoltaic power converter 220 in the single fiber dual optical link system 200 of FIG. 2. Shown in FIG. 4 is a front view of an array of photovoltaic cells 320 of FIG. 3. The photovoltaic power converter 300 may comprise an array of photodetectors 320 fabricated for a single laser wavelength rather than the broadband solar emission. The use of a designed band gap, matched to the laser wavelength, enables higher conversion efficiencies and reduces the amount of waste heat. In some embodiments, to minimize size and weight, the power converter 300 may be designed to handle 1 kilowatt of laser power with an area of just a few square centimeters, commensurate with the ability to remove waste heat. An array 320 of photovoltaic cells 323 are provided. In some embodiments, large area gold connections 324, including low ohmic loss gold layer 321, instead of wire bonds, may be used to reduce ohmic loss. In one possible embodiment, the photovoltaic cells 323, may be multi-junction photovoltaic diodes that reduce the overall current by increasing the operating voltage using four or more junctions.

An optical focuser 327, such as a microlens array or a splitter, may be used to focus the laser power 315 from the fiber 355 onto active photovoltaic cells 323, for example onto GaAs photovoltaic cells. After passing through the focuser 327, multiple columns of laser light 313 are each directed onto respective ones of the multiple photovoltaic cells 323.

Because the device is not flood illuminated, the electrical connections do not have to be thin. With much wider cross sectional area electrical connections, resistive losses from high current are minimized. By further reducing the current using multiple junctions, as mentioned above, the conversion efficiency can be greatly improved.

An example of a photovoltaic array is provided in U.S. patent application Ser. No. 11/683,434, by Sumida et al., filed on Mar. 8, 2007, entitled PIXALATED PHOTOVOLTAIC ARRAY METHOD AND APPARATUS, which is herein incorporate by reference in its entirety.

In various single fiber dual optical link systems 200, the high power laser 210 provides power, which may be sent to the photovoltaic power converter 220 at a remote site to generate electrical power. Similarly, the lower power optical data link may send data from the remote site to the high power laser location or other location. The data transmitter/receivers 290 and/or 280 need not be collocated with the corresponding high power laser 210 and/or photovoltaic power converter 220.

For example, power may be transmit along the dual link fiber 250 to a remote vehicle (not show) on the high power link, while video data is transmit from the remote vehicle back along the dual link fiber 250 on the data link for display and viewing by an operator (not show) near a high power source such as high power laser 210. In yet further embodiments, the operator may send commands along the dual link fiber 250 on the data link to the remote vehicle in response to a display (not shown) of the video data.

The data link may be bi-directional as shown, or uni-directional, if desired.

Furthermore, in some embodiments, in lieu of the photovoltaic power converter 220 serving as a laser energy power converter, depending on the wavelength of the laser power, other types of laser energy power converters may be used. The laser power could be delivered or diverted to thermally reactive devices, such as thermal actuators, to photostrictive devices, or other thermal or photonic energy converters or cells, for conversion.

Using the same fiber 100 as the power delivery system to transmit data to and from the remote site as well, saves on the additional cost of having a second data fiber link. Further, a wide bandwidth data signal that can share the same optical fiber 100 in the link, to supply power along with the data through the optical link, provides a reduced weight fiber optic power and data transmission system.

The single fiber dual optical link system 200 could be used where unattended sensors or unmanned vehicles need to operate over periods that are much longer than is possible with batteries, and where power transmission by metallic wire is unacceptable because of weight or electromagnetic interference concerns.

In various embodiments, the double clad fiber 100 allows data rates on the order of 10 Gbps to be transmitted along with 100's of watts of optical power.

In some embodiments, a multi-mode step-index optical fiber may be used as the dual link fiber 250 to deliver the optical power and the optical data signal. If the optical data signal, as well as the optical power, is communicated along a multi-mode channel in the dual link fiber 250, the bandwidth of the data signal could potentially be limited by modal dispersion. For typical multi-mode step-index fibers, the data rate is on the order of 10 Mbps-km. While this may be acceptable for many single sensor applications, in situations where the data from multiple remote sensors needs to be fused together into a higher rate bit-stream, the above discussed double clad fiber 100 of FIG. 1 could be used.

Various nonlimiting embodiments could be utilized by unmanned air and ground vehicles, where vehicle size and weight are important, or in fly-by-light power and control of vehicle surfaces where electromagnetic interference (EMI) is of concern. Applications may include automotive, search and rescue, exploration, military defense, or any application where battery weight, power consumption, or electromagnetic interference is a problem, or where safety, system reliability, operating time, observability, operating time, or redundancy impose limitations on a system.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. A fiber optic system comprising:
   a) a high power link comprising;
      i) a single fiber dual optical link;
      ii) a laser power source coupled via a first wavelength selective coupler to the single fiber dual optical link;
      iii) a laser energy power converter coupled via a second wavelength selective coupler to the single fiber dual optical link; and
   b) an optical data link comprising:
      i) the single fiber dual optical link;
      ii) a data transmitter coupled via the first wavelength selective coupler to the single fiber dual optical link; and
      iii) a data receiver coupled via the second wavelength selective coupler to the single fiber dual optical link;
   c) wherein the single fiber dual optical link comprises a clad fiber comprising a core with a first index of refraction and a first cladding with a second index of refraction, and wherein the first index of refraction is greater than the second index of refraction; and
   d) wherein the clad fiber further comprises a second cladding with a third index of refraction, the third index of refraction being less than the second index of refraction.

2. The fiber optic system of claim 1, wherein the core is single mode at an optical data wavelength, and wherein the first cladding is multi-mode at a laser power wavelength, and wherein the data transmission wavelength is less than the laser power wavelength.

3. The fiber optic system of claim 2, wherein the core and the first cladding are not doped with signal amplifying material.

4. The fiber optic system of claim 1, wherein the single fiber dual optical link comprises a multi-mode fiber.

5. The fiber optic system of claim 1, wherein the first wavelength selective coupler comprises a wavelength division multiplexer, and wherein the second wavelength selective coupler comprises a wavelength division multiplexer.

6. The fiber optic system of claim 1, wherein the transmitter is a transmitter/receiver, and wherein the receiver is a transmitter/receiver.

7. The fiber optic system of claim 1, wherein the laser energy power converter comprises at least one of: (a) a thermally reactive device; (b) a photovoltaic device; (c) photostrictive device.

8. A fiber optic system comprising:
a) a high power link comprising;
i) a single fiber dual optical link;
ii) a laser power source coupled via a first wavelength selective coupler to the single fiber dual optical link; and
iii) a laser energy power converter coupled via a second wavelength selective coupler to the single fiber dual optical link;
b) an optical data link comprising:
i) the single fiber dual optical link;
ii) a data transmitter coupled via the first wavelength selective coupler to the single fiber dual optical link; and
iii) a data receiver coupled via the second wavelength selective coupler to the single fiber dual optical link; and
c) wherein the optical data link further comprises a pair of secondary wavelength selective couplers, one of the pair of secondary wavelength selective couplers being connected between the first wavelength selective coupler and the data transmitter, and an other of the pair of secondary wavelength selective couplers being connected between the data receiver and the second wavelength selective coupler.

9. The fiber optic system of claim 8, further comprising a pair of optical terminators, each one of the pair of optical terminators being coupled to a respective one of the pair of secondary wavelength selective couplers.

10. The fiber optic system of claim 8, wherein the single fiber dual optical link comprises an optical fiber having a core and a first cladding, wherein the core is single mode at an optical data wavelength, and wherein the first cladding is multi-mode at a laser power wavelength, and wherein the data transmission wavelength is less than the laser power wavelength.

11. The fiber optic system of claim 10, wherein the core and the first cladding are not doped with signal amplifying material.

12. The fiber optic system of claim 8, wherein the single fiber dual optical link comprises a multi-mode fiber.

13. The fiber optic system of claim 8, wherein the first wavelength selective coupler comprises a wavelength division multiplexer, and wherein the second wavelength selective coupler comprises a wavelength division multiplexer.

14. The fiber optic system of claim 8, wherein the transmitter is a transmitter/receiver, and wherein the receiver is a transmitter/receiver.

15. The fiber optic system of claim 8, wherein the laser energy power converter comprises at least one of: (a) a thermally reactive device; (b) a photovoltaic device; (c) photostrictive device.

16. A fiber optic system comprising:
a) a high power link comprising;
i) a single fiber dual optical link;
ii) a laser power source coupled via a first wavelength selective coupler to the single fiber dual optical link; and
iii) a laser energy power converter coupled via a second wavelength selective coupler to the single fiber dual optical link;
b) an optical data link comprising:
i) the single fiber dual optical link;
ii) a data transmitter coupled via the first wavelength selective coupler to the single fiber dual optical link; and
iii) a data receiver coupled via the second wavelength selective coupler to the single fiber dual optical link; and
c) wherein the optical data link further comprises a pair of wavelength selective filters, one of the pair of wavelength selective filters being connected between the first wavelength selective coupler and the data transmitter, and an other of the wavelength selective filters being connected between the data receiver and the second wavelength selective coupler.

17. The fiber optic system of claim 16, wherein the single fiber dual optical link comprises an optical fiber having a core and a first cladding, wherein the core is single mode at an optical data wavelength, and wherein the first cladding is multi-mode at a laser power wavelength, and wherein the data transmission wavelength is less than the laser power wavelength.

18. The fiber optic system of claim 17, wherein the core and the first cladding are not doped with signal amplifying material.

19. The fiber optic system of claim 16, wherein the single fiber dual optical link comprises a multi-mode fiber.

20. The fiber optic system of claim 16, wherein the first wavelength selective coupler comprises a wavelength division multiplexer, and wherein the second wavelength selective coupler comprises a wavelength division multiplexer.

21. The fiber optic system of claim 16, wherein the transmitter is a transmitter/receiver, and wherein the receiver is a transmitter/receiver.

22. The fiber optic system of claim 16, wherein the laser energy power converter comprises at least one of: (a) a thermally reactive device; (b) a photovoltaic device; (c) photostrictive device.

\* \* \* \* \*